United States Patent [19]

Rand

[11] 4,425,808
[45] Jan. 17, 1984

[54] THIN FILM STRAIN TRANSDUCER

[75] Inventor: James L. Rand, San Antonio, Tex.

[73] Assignee: The United States of America as represented by the Administrator of the National Aeronautics and Space Administration, Washington, D.C.

[21] Appl. No.: 352,827

[22] Filed: Feb. 26, 1982

[51] Int. Cl.³ .............................................. G01L 1/22
[52] U.S. Cl. ............................................... 73/862.65
[58] Field of Search .......... 73/862.65, 862.66, 862.67, 73/838, 862.39; 338/2, 3, 4, 5, 6

[56] References Cited

U.S. PATENT DOCUMENTS 2,600,701  6/1952  Statham et al. ................. 201/63
4,048,850  9/1977  Ramberg et al. ............. 73/862.39 X
4,166,384  9/1979  Matsuda et al. .
4,175,428  11/1979 Eilersen .
4,282,762  8/1981  Zenker ........................ 73/862.65 X Primary Examiner—Jerry W. Myracle
Attorney, Agent, or Firm—Howard J. Osborn; John R. Manning; Wallace J. Nelson

[57] ABSTRACT

A strain transducer system 10 and process for making same is disclosed wherein a beryllium-copper ring 13 having four strain gages 12, 14, 26 and 28 disposed thereon and electrically connected in Wheatstone bridge fashion to output instrumentation 25. Tabs 16 and 20 are bonded to a balloon or like surface 11 with strain on the surface 11 causing bending of ring 13 and providing an electrical signal through gages 12, 14, 26 and 28 proportional to the surface strain. FIG. 2 illustrates a pattern of a one-half ring segment as placed on a sheet of beryllium-copper for chem-mill etch formation, prior to bending and welding of a pair of the segments to form a ring structure 13.

9 Claims, 2 Drawing Figures

THIN FILM STRAIN TRANSDUCER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Scientific balloon platforms have been developed to carry payloads to the upper limits of the atmosphere to observe and record a variety of phenomena. Design, analysis techniques, and film quality have steadily improved such that balloon flights are now performed on a relatively routine basis. Scientists, however, need systems that can carry heavier payloads to higher altitudes for longer durations. This requires balloons which test state-of-the-art film design and production. The degraded reliability of heavy lift systems is well known and emphasizes the need for a more precise approach to balloon design and manufacturing.

The most widely used scientific balloon system is the natural shaped balloon made of thin, balanced, polyethylene film. Unfortunately, balloon strain cannot be predicted accurately by closed form analytical methods. Although balloon stresses are not usually of sufficient magnitude to cause failure of the balloon film, they do cause cracks to propagate and provide a state conducive to amplification of any flaws or manufacturing defects.

Flight testing of balloons has been used successfully to obtain data on atmospheric properties, gas and skin temperatures, radiant flux, and pressure measurements. Attempts to measure film or tape stress and strain, however, have not been completely successful. The hostile environment of flight is dynamic and includes a variety of heat transfer mechanisms which alter the balloon and sensor temperatures. The films are so thin that the presence of a sensor usually results in a localized stiffening of the film which alters the measurement. As a result, even large gage lengths on very stiff materials such as polyester films are used with only limited success. There is need for a strain gage suitable for flight which can verify or negate the assumptions contained in thin film balloon stress prediction analyses. In addition, need has been established for an analytic model of the thin polyethylene film used in fabrication of scientific balloon platforms. A description of the mechanical response of balloon materials is necessary if stresses are to be deduced from in-flight strain measurements. This invention relates to a unique sensor capable of monitoring the strain in the wall of a typical balloon when exposed to the hostile environment of ascent and float. Its use will facilitate prediction of balloon stresses for particular flights, and design and testing of balloon materials in general.

It is therefore an object of the present invention to provide a strain transducer system which is suitable for in-flight measurement of balloon film strain because of its lightweight, linear response to strain, and mechanical and electrical compatibility with existing balloon systems.

A further object of this invention is to provide a strain transducer with an annular configuration that is insensitive to the transverse forces and thermal distortions experienced by balloons during flight.

Another object of this invention is to provide a strain transducer with a low effective modulus of elasticity that is particularly sensitive to the relatively small longitudinal forces and large deformations suffered by balloons in flight.

A still further object of this invention is to provide a device that can function in ranges from relatively warm temperatures (+25° C.) of an afternoon launch to the lowest temperatures (−80° C.) found during ascent through the tropopause.

An additional object of the present invention is to provide a strain transducer system with attachment tabs that minimize the local discontinuities in film stress caused by stiffness at the points where the transducer is fitted to the thin film balloon surface.

SUMMARY OF THE INVENTION

The foregoing and other objects of the invention are achieved by providing a transducer comprised of a thin, lightweight, ring shaped metal strip. This transducer device is attached to a thin walled polyethylene scientific balloon via tabs specifically designed to minimize stiffness at the attach points. The transducer has a low effective modulus so as not to interfere with the strain that naturally occurs in balloon walls. Therefore, bending rigidity of the metal strip is such that the force required to deform the sensor is small relative to forces required to displace the film.

Strain gages are attached to the annular metal strip to form a Wheatstone bridge circuit. The output from the balanced bridge is taken proportional to the bending strain in the metal strip between the attachment tabs. By suitable choice of strain gages, the transducer can have a standard 350 ohm impedance which is compatible with bridge balance, amplification, and telemetry instrumentation available for balloon flight.

Prior art strain transducers normally measure small deformations caused by relatively large forces. The transducer of the present invention has a high sensitivity to longitudinal strain. This sensitivity is constant over the range of temperatures and strains normally experienced during balloon flight. In addition, the invention is not appreciably affected by thermal distortions. These characteristics make this transducer system particularly attractive for functioning under the small forces and large elongations characteristic of balloons in flight.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein.

DETAILED DESCRIPTION OF THE INVENTION

The invention relates to a strain transducer system useful for measuring strain on an expandable material and particularly suitable for in-flight measurements of balloon film strain. The transducer is comprised of a ring shaped beryllium-copper strip with two tabs that can attach to the thin film of balloon surfaces. Four strain gages and associated wiring are affixed to the ring to form a Wheatstone bridge circuit. The invention is lightweight and thermally passive. It responds linearly to strain, has a low modulus of elasticity, and is mechanically and electrically compatible with existing balloon systems. Though the preferred embodiment describes a strain gage used to measure the strain suffered by thin film polyethylene balloons, other applications for this invention will become apparent to those skilled in the art.

Figure 1:
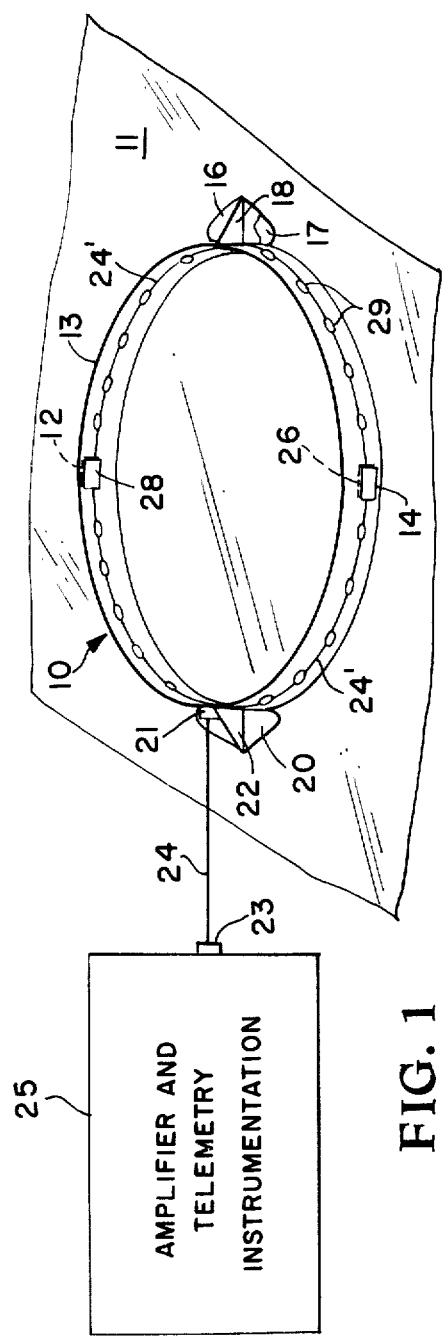
FIG. 1 is a part schematic view of the thin film strain transducer of the present invention showing the strain gages, attachment tabs (with part of one broken away to illustrate the buffer pads), and associated wiring on a balloon surface segment.

Referring now more particularly to FIG. 1, the strain transducer system of the present invention is shown and generally designated by reference numeral 10. An important design feature of the invention is minimization of the induced stiffness at the attachment points where the gage ring 13 is fitted to balloon surface 11. Tabs 16 and 20 were designed to satisfy this requirement.

Analysis of several triangular tab configurations indicated a relatively large stress concentration in the balloon film at the vertex of the tab. A 70% percent increase in the applied stress was computed. Such stress is sufficient to cause gross film deformation and possible failure of the film at low temperatures. Therefore, a tab configuration was designed with a 2:1 elliptic geometry as shown by tab 16 in FIG. 1. As a result, the maximum film stress concentration was reduced to less than 24%; however, the apparent strain was increased by 17%. To minimize the tab influence on apparent strain, the straight edges shown on tab 16 were used to bound the gage length. In addition, the gage length was increased to further reduce apparent strain. The distance between tabs 16 and 20 was set at 76 millimeters so that the apparent strain remained within 3% of the film strain in the absence of the gage. To further minimize stress concentrations, the outer edge of tabs 16 and 20 were provided with curvature. A semicircular shape with rounded corners was selected for this boundary as depicted by tab 16 in FIG. 1. In addition, the tabs were fitted with polyethylene buffer pads (one of which is designated by reference numeral 17) to minimize the disturbance to the stress field between the tabs.

The thickness of the metal strip forming transducer ring 13 was another critical design parameter. Optimal thickness is dependent on the choice of material. Recognizing the need for a material with low hysteresis and a high proportional limit, a copper alloy was selected for its remarkably linear behavior, high endurance and strength limits, thermal compatibility with precision strain gages, availability in small thicknesses and ease of formability. The alloy selected contains 1.80-2.00 percent beryllium and is described by a variety of specifications (ASTM B-194-72, QQ-C-533, AMS 4503B, and ASM 4532A). The particular material employed in the specific embodiment described herein was obtained from Brush Wellman, Inc., 17876 St. Clair Avenue, Cleveland, Ohio, 44110, and is identified by Brush Wellman as Alloy 25. In order to have a gage length of 76 millimeters, the ring 13 radius was set at 38 millimeters. The thinnest material available created unacceptably high stresses in the transducer, and the thickest material considered caused an unacceptably high ratio of transducer to film force. A strip thickness of 0.0889 mm was finally selected as a compromise.

Figure 2:
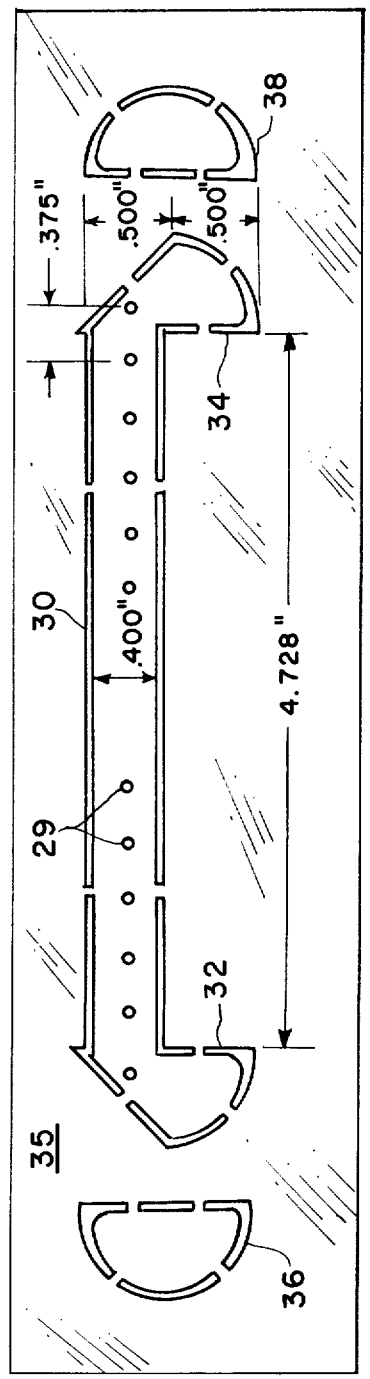
FIG. 2 shows the chemical milling pattern used to fabricate the thin film transducer of the present invention.

The thin film strain transducer is fabricated in four pieces from beryllium-copper coil stock. Due to the thickness of the strip material, chemical milling of the sheet proves to be the most economical and accurate method of forming the transducer components. A pattern 30 is first drawn on a scale four times that described and then reduced photographically to produce a negative of the appropriate dimensions. The resulting negative, FIG. 2, is then transferred to the beryllium-copper sheet 35 and the boundaries of the pattern etched away by a conventional chem-mill process. In this process, the thin plate is cleaned and coated with "photo polymer resist;" exposed to ultraviolet light to produce a high contrast image; developed in commercial "photo polymer" developer; etched in Ferric Chloride-42 degree Be at 135° F. The "photo resist" is then removed with a commercial MEK based stripper. "Photo polymer resist", "photo polymer" developer and the methylethylketone (MEK) stripper are standard commercial items and are readily obtainable from Kodak and other commercial sources. The pattern 30 is sized to preserve the basic design geometry and provide sufficient material to accommodate a bend radius of five times the sheet thickness to form the tab.

The two bends 32 and 34 in FIG. 2 form half of gussets 18 and 22 and tabs 16 and 20 in FIG. 1. The selected material is in the half-hard condition so that bending is accomplished without damage. Two strips are spot welded together. Semicircular tabs 36 and 38 in FIG. 2 are then welded to the tabs on the strips to form a double layer tab. The welded ring is then placed on a brass mandrel having the same thermal characteristics as the beryllium-copper alloy, and heat treated for two hours at 315° C. This heating brings the material to full strength. The transducer is electrochemically treated to remove the oxide coating that forms during the heat treating process. In the specific embodiment described herein oxide was removed by means of an alkaline deoxidizing tradename compound known as Endox® 214 and manufactured by Enthone, Inc., West Haven, Conn. The process involved immersion of the strip into a solution of one ounce Endox to one pint of water. A potential of eight volts was then applied for one minute per ring. The Endox employed herein was supplied by Delgman Supply Company, Inc., 113 South Magnolia, P.O. Box 579, North Little Rock, Ark., 72115.

Four precision strain gages 12, 14, 26 and 28 are bonded to the inner and outer surfaces at the center ring 13. Gages 12 and 14 are diametrically opposed and located on the exterior surface of transducer ring surface while gages 26 and 28 are positioned on the inner surface of the ring as shown in FIG. 1. The gages are standard 350 ohm general purpose gages having a constant grid completely encapsulated in polyimide with large, integral, copper-coated terminals. The gages employed in the specific example described herein were obtained from Micromeasurements, Inc., P.O. Box 27777, Raleigh, N.C., 27611, under their type designation CEA-09-125UW-350. The gage resistance was selected due to its enhanced current carrying ability and compatibility with other low impedance devices currently used on scientific balloons. The gages are thermally compensated for beryllium-copper and calibrated for use in the temperature range from −75° C. to +205° C.

The strain gages are bonded to the transducer with a suitable adhesive with M-Bond 600, a Micromeasurements Inc. product having a wide temperature range capability being employed in the described embodiment. This two component, solvent thinned epoxyphenolic adhesive is recommended for high precision transducers and has an operating temperature range from −269° C. to +260° C. The adhesive is cured for two hours at 55° C. Curing produces an oxide coating on the transducer that must be cleaned prior to applying any coatings for moisture or thermal control. This cleaning was accomplished by using MEK (methylethylkeytone) applied with a cotton swab, washing with Alconox detergent and water, rinsing under running water and dried in an oven at 110° F. for twenty minutes. In addition to the gages, a terminal board 21 (not illustrated) is bonded to tab 20 to facilitate wiring of the gages into a Wheatstone bridge circuit.

The bridge circuit is formed by connecting the two gages 12 and 14 on the outer surface of the ring into opposite areas of the circuit. The gages 26 and 28, on the inner ring surface, also form opposite circuit arms and are used to complete the four active arm bridge. In this configuration, the output of the circuit is insensitive to any axial and thermal strains common to all gages. The output from the balanced bridge is theoretically proportional to the bending strain in the beryllium-copper strip. As such, the output signal is directly proportional to the film strain between the tabs 16 and 20 of the transducer. The wiring is completed by using a white four conductor shielded cable 24 with the individual wires 24' thereof threaded through suitable holes 29 in ring 13 and leading through a terminal board 21 disposed on tab 20 to conventional bridge amplifier and telemetry instrumentation 25. Cable 24 in the specific example described was a four conductor, shielded ultraflexible cable (Bioelectric Cable No. CZ 1103-4F) supplied by Cooner Wire Company, 9186 Independence Avenue, Chatsworth, Ca., 91311. The end of cable 24 leading to amplifier and telemetry instrumentation was terminated with a four pin microminature plug (NO. DP-45-1) obtained from Microtech, Inc., 1420 Conchester Highway, Boothwyn, Pa., 19061, and designated by reference numeral 23 in FIG. 1. The final step in the fabrication process involves applying a thermal control waterproof coating to the metal strip, tabs, strain gages, and buffer pads. This coating serves to protect the strain gages and terminal connections from any moisture encountered during balloon flight as well as providing passive thermal control because of the resulting low absorptivity and high emissivity. In the specific example described herein, the white thermal control coating employed was designated as S-13G/LO and produced by IIT Research Institute, 10 West 35th Street, Chicago, Ill., 60616.

OPERATION OF THE INVENTION

The transducer is anchored to balloon film 11 so that the plane containing the circle is parallel to the film. As balloon film 11 is strained by the dynamics of flight, the transducer ring 13 is displaced. Assuming the film strain is constant between tabs 16 and 20 in FIG. 1, the tabs collect the force required to deform the ring.

A reactive force necessarily accompanies the displacement of transducer ring 13. Due to the low effective modulus of the transducer, however, this force is small relative to the force required to displace film 11 through the same strain. A load path is established from film 11, through each tab connection, partially to the ring and the balance to the film between the tabs. As mentioned, the tabs increase the apparent strain; however, the effect of the transducer stiffness on the balloon surface reduces the force film 11 is required to transfer. These two effects tend to balance each other minimizing the associated errors.

Testing has demonstrated that transducer 10 has a high sensitivity to longitudinal strain (7.216 mV/V/unit strain). The sensitivity is constant for all temperatures from +25° C. to −80° C., and all strains from five percent compression to ten percent tensile strain. The response is highly sensitive to the separation distance of the tabs, and relatively insensitive (0.27 percent) to transverse forces. Tests further show that transducer 10 responds in a constant linear fashion at all strains and temperatures of interest. In addition, the sensor ring standard 350 ohm impedance was found to be electrically compatible with bridge amplifiers and telemetry instrumentation currently used on scientific balloons.

The specifically described example transducer and the process for making same described herein are to be considered as exemplary only and are not to be deemed as exhaustive. Also, although the performance of the specific embodiment described herein is for measuring strain on atmospheric balloon structures, the invention is not so limited and, as will be apparent to those skilled in the art, the transducer gage system of the present invention would find utility in measurements of strain on any suitable material adapted to be placed under strain. Thus, there are obviously many variations and modifications of the present invention that will be readily apparent to those skilled in the art in light of the above teachings. Accordingly, the invention may be practiced other than described herein without departing from the spirit or scope of the appended claims.

What is claimed as new and desired to be secured by Letters Patent of the United States is:

1. A strain transducer system comprising:
   a ring shaped metal strip;
   a plurality of strain gages secured to said metal strip in a Wheatstone bridge configuration;
   means for attaching said ring shaped metal strip to the continuous surface of an inflatable member upon which strain is to be measured; and
   means for measuring changes in the ring shaped metal strip as a function of strain on the attached continuous surface.

2. A strain transducer system comprising:
   a ring shaped metal strip;
   a plurality of strain gages secured to said metal strip in a Wheatstone bridge configuration;
   means for attaching said ring shaped metal strip to a surface upon which strain is to be measured;
   means for measuring changes in the ring shaped metal strip as a function of strain on the attached surface; and
   wherein said means for attaching said ring shaped metal strip comprises a pair of tab elements and said tab elements are fitted with polyethylene buffer pads for attaching said metal strip to a thin film balloon surface to produce minimum disturbance to the stress fields between the tab elements.

3. A strain transducer system as in claim 2 wherein said ring shaped metal strip is comprised of a thin sheet of beryllium-copper alloy in the half-hard condition.

4. The strain transducer system of claim 3 wherein said ring shaped metal strip has a radius of 38 millimeters.

5. A strain transducer system as in claim 2 wherein said pair of tab elements are positioned diametrically opposed on said ring shaped metal strip.

6. The strain transducer of claim 5 wherein four said strain gages with a resistivity of 350 ohms each are wired about said ring shaped metal strip to form a four active arm Wheatstone bridge to amplify bending and cancel axial and thermal strain on said metal strip.

7. The strain transducer system of claim 6 wherein said tab elements have a semicircular shape with rounded corners to minimize the stress concentrations induced by said tab elements.

8. A strain transducer system as in claim 7 wherein said ring shaped metal strip has a thickness of 0.0889 millimeters.

9. The strain transducer of claim 2 including a waterproof coating applied to said metal strip, tab elements, strain gages, and buffer pads to provide protection from the effects of moisture.

* * * * *